United States Patent
Jin et al.

(10) Patent No.: US 8,099,725 B2
(45) Date of Patent: Jan. 17, 2012

(54) METHOD AND APPARATUS FOR GENERATING CODE FOR AN EXTRACT, TRANSFORM, AND LOAD (ETL) DATA FLOW

(75) Inventors: Qi Jin, San Jose, CA (US); Hui Liao, Santa Clara, CA (US); Lin Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 11/548,659

(22) Filed: Oct. 11, 2006

(65) Prior Publication Data
US 2008/0092112 A1    Apr. 17, 2008

(51) Int. Cl.
G06F 9/44    (2006.01)
G06F 9/45    (2006.01)

(52) U.S. Cl. ........ 717/151; 717/106; 717/153; 717/154; 717/159

(58) Field of Classification Search .................. None
See application file for complete search history.

(56) References Cited

U.S. PATENT DOCUMENTS

| | | |
|---|---|---|
| 4,901,221 A | 2/1990 | Kodosky et al. |
| 5,497,500 A | 3/1996 | Rogers et al. |
| 5,577,253 A | 11/1996 | Blickstein |
| 5,850,548 A | 12/1998 | Williams |
| 5,920,721 A | 7/1999 | Hunter et al. |
| 5,966,532 A | 10/1999 | McDonald et al. |
| 6,014,670 A | 1/2000 | Zamanian et al. |
| 6,044,217 A | 3/2000 | Brealey et al. |
| 6,098,153 A | 8/2000 | Fuld et al. |
| 6,208,990 B1 | 3/2001 | Suresh et al. |
| 6,282,699 B1 | 8/2001 | Zhang et al. |
| 6,434,739 B1 | 8/2002 | Branson et al. |
| 6,449,619 B1 | 9/2002 | Colliat et al. |
| 6,480,842 B1 | 11/2002 | Agassi et al. |
| 6,604,110 B1 | 8/2003 | Savage et al. |
| 6,772,409 B1 | 8/2004 | Chawla et al. |
| 6,795,790 B1 | 9/2004 | Lang et al. |
| 6,839,724 B2 | 1/2005 | Manchanda et al. |
| 6,850,925 B2 | 2/2005 | Chaudhuri et al. |
| 6,968,326 B2 | 11/2005 | Johnson et al. |
| 6,968,335 B2 | 11/2005 | Bayliss et al. |
| 6,978,270 B1 | 12/2005 | Carty et al. |
| 7,003,560 B1* | 2/2006 | Mullen et al. ................. 709/223 |
| 7,031,987 B2 | 4/2006 | Mukkamalla et al. |
| 7,035,786 B1 | 4/2006 | Abu El Ata et al. |
| 7,076,765 B1 | 7/2006 | Omori |

(Continued)

OTHER PUBLICATIONS

Arusinski et al., "A Software Port from a Standalone Communications Management Unit to an Integrated Platform", 2002, IEEE, pp. 1-9.

(Continued)

*Primary Examiner* — Chuck O Kendall
(74) *Attorney, Agent, or Firm* — Patterson & Sheridan, LLP (57) ABSTRACT

Methods, computer program products, and system for generating code for an extract, transform, and load (ETL) data flow are provided. In one implementation, the method includes receiving an ETL data flow representing a logical transformation and flow of data, placing a staging table at a pre-determined location in the ETL data flow to reduce a total number of staging tables required by the transformation, and generating code for the transformation based on the ETL data flow including the staging table placed at the pre-determined location.

18 Claims, 8 Drawing Sheets

U.S. PATENT DOCUMENTS

| | | |
|---|---|---|
| 7,103,590 B1 | 9/2006 | Murthy et al. |
| 7,209,925 B2 | 4/2007 | Srinivasan et al. |
| 7,499,917 B2 | 3/2009 | Purcell et al. |
| 2002/0046301 A1 | 4/2002 | Shannon et al. |
| 2002/0116376 A1 | 8/2002 | Iwata et al. |
| 2002/0170035 A1 | 11/2002 | Casati et al. |
| 2003/0033437 A1 | 2/2003 | Fischer et al. |
| 2003/0037322 A1 | 2/2003 | Kodesky et al. |
| 2003/0051226 A1 | 3/2003 | Zimmer et al. |
| 2003/0101098 A1 | 5/2003 | Schaarschmidt |
| 2003/0110470 A1 | 6/2003 | Hanson et al. |
| 2003/0149556 A1 | 8/2003 | Riess |
| 2003/0154274 A1 | 8/2003 | Nakamura |
| 2003/0172059 A1 | 9/2003 | Andrei |
| 2003/0182651 A1 | 9/2003 | Secrist et al. |
| 2003/0233374 A1 | 12/2003 | Spinola et al. |
| 2004/0054684 A1 | 3/2004 | Geels |
| 2004/0068479 A1 | 4/2004 | Wolfson et al. |
| 2004/0254948 A1 | 12/2004 | Yao |
| 2005/0044527 A1 | 2/2005 | Recinto |
| 2005/0055257 A1 | 3/2005 | Senturk et al. |
| 2005/0091664 A1 | 4/2005 | Cook et al. |
| 2005/0097103 A1 | 5/2005 | Zane et al. |
| 2005/0137852 A1 | 6/2005 | Chari et al. |
| 2005/0174988 A1 | 8/2005 | Bieber et al. |
| 2005/0188353 A1 | 8/2005 | Hasson et al. |
| 2005/0216497 A1 | 9/2005 | Kruse et al. |
| 2005/0227216 A1 | 10/2005 | Gupta |
| 2005/0240354 A1 | 10/2005 | Mamou et al. |
| 2005/0240652 A1 | 10/2005 | Crick |
| 2005/0243604 A1 | 11/2005 | Harken et al. |
| 2005/0256892 A1 | 11/2005 | Harken |
| 2006/0036522 A1 | 2/2006 | Perham |
| 2006/0047709 A1 | 3/2006 | Belin et al. |
| 2006/0074621 A1 | 4/2006 | Rachman |
| 2006/0074730 A1 | 4/2006 | Shukla et al. |
| 2006/0112109 A1 | 5/2006 | Chowdhary et al. |
| 2006/0167865 A1 | 7/2006 | Andrei |
| 2006/0206869 A1 | 9/2006 | Lewis et al. |
| 2006/0212475 A1 | 9/2006 | Cheng |
| 2006/0218123 A1 | 9/2006 | Chowdhuri et al. |
| 2007/0061305 A1 | 3/2007 | Azizi |
| 2007/0157191 A1 | 7/2007 | Seeger et al. |
| 2007/0169040 A1 | 7/2007 | Chen |
| 2007/0203893 A1 | 8/2007 | Krinsky et al. |
| 2007/0214111 A1 | 9/2007 | Jin et al. |
| 2007/0214171 A1 | 9/2007 | Behnen et al. |
| 2007/0214176 A1 | 9/2007 | Rao et al. |
| 2007/0244876 A1 | 10/2007 | Jin et al. |

OTHER PUBLICATIONS

Carreira et al., "Data Mapper: An Operator for Expressing One-to Many Data Transformations", Data Warehousing and Knowledge Discovery, Tjoa et al, editors, 7th International Conference DaWaK 2005 Copenhagen, Denmark, Aug. 22-26, 2005, pp. 136-145.

Ferguson et al., "Platform Independent Translations for a Compilable Ada Abstract Syntax", Feb. 1993 ACM 0-89791-621-2/93/0009-0312 1.50, pp. 312-322.

Friedrich, II, Meta-Data Version and Configuration Management in Multi-Vendor Environments, SIGMOND, Jun. 14-16, 2005, 6 pgs., Baltimore, MD.

Gurd et al., "The Manchester Prototype Dataflow Computer", Communications of the ACM, Jan. 1985, pp. 34-52, vol. 28, No. 1.

Haas et al., "Clio Grows Up: From Research Prototype to Industrial Tool", SIGMOND, Jun. 14-16; 2005, 6 pgs., Baltimore, MD.

Jardim-Gonçalves et al., "Integration and adoptability of APs: the role of ISO TC184/SC4 standards", International Journal of Computer Applications in Technology, 2003, pp. 105-116, vol. 18, Nos. 1-4.

Poess et al., "TPC-DS, Taking Decision Support Benchmarking to the Next Level", ACM SIGMOND, Jun. 4-6, 2002, 6 pgs., Madison, WI.

Simitsis, "Mapping Conceptual to Logical Models for ETL Processes", ACM Digital Library, 2005, pp. 67-76.

Stewart et al., "Dynamic Applications from the Ground Up", Haskell '05, Sep. 30, 2005, Tallinn, Estonia, ACM, pp. 27-38.

Vassiliadis et al., "A generic and customizable framework for the design of ETL scenarios", Information Systems, Databases: Creation, Management and Utilization, 2005, pp. 492-525, vol. 30, No. 7.

Werner et al., "Just-in-sequence material supply—a simulation based solution in electronics", Robotics and Computer-Integrated Manufacturing, 2003, pp. 107-111, vol. 19, Nos. 1-2.

Yu, "Transform Merging of ETL Data Flow Plan", IKE '03 International Conference, 2003, pp. 193-198.

Zhao et al., "Automated Glue/Wrapper Code Generation in Integration of Distributed and Heterogeneous Software Components", Proceedings of the 8th IEEE International Enterprise Distributed Object Computing Conf. (EDOC 2004), 2004, IEEE, pp. 1-11.

Hernandez et al., "Clio: A schema mapping tool for information Integration", IEEE Computer Society, 2005.

Carrelra et al., "Execution of data mappers".

Rifaieh et al., "Query-based data warehousing tool".

"Method and system for generating data flow execution components in heterogeneous data Integration environments", U.S. App. No. 11/372,540, filed Mar. 10, 2006.

"Dilation of sub-flow operations in a data flow", U.S. Appl. No. 11/372,516, filed Mar. 10, 2006.

"Classification and sequencing of mixed data flows", U.S. Appl. No. 11/373,084, filed Mar. 10, 2006.

"Data flow system and method for heterogeneous data integration environments", U.S. Appl. No. 11/373,686, filed Mar. 10, 2006.

U.S. Appl. No. 09/707,504, filed Nov. 7, 2000, Banavar et al.

Method and Apparatus for Modelling Data Exchange in a Data Flow of an Extract, Transform, and Load (ETL) Process, U.S. Appl. No. 11/621,521, filed Jan. 9, 2007.

Ramu, "Method for Initializing a Platform and Code Independent Library," IBM Technical Disclosure Bulletin, vol. 37, No. 9, Sep. 1994, pp. 637-638.

Tjoa, A. Min, "Data Warehousing and Knowledge Discovery," 7th International Conference, DaWaK 2005, Copenhagen, Denmark, Aug. 22-26, 2005, Proceedings Springer 2005.

Yu, "Transform Merging of ETL Data Flow Plan," INSPEC AN-8057504, International Conference on Information and Knowledge Engineering—IKE '03, Pt. vol. 1, pp. 193-198, USA, 2003.

Konstantinides, et al., "The Khoros Software Development Environment for Image and Signal Processing," May 1994, IEEE, vol. 3, pp. 243-252.

Office Action of U.S. Appl. No. 11/32,540 dated Mar. 30, 2011.

Final Office Action of U.S. Appl. No. 11/610,480 dated Apr. 13, 2011.

\* cited by examiner

METHOD AND APPARATUS FOR GENERATING CODE FOR AN EXTRACT, TRANSFORM, AND LOAD (ETL) DATA FLOW

CROSS-REFERENCE TO RELATED APPLICATIONS

This application is related to U.S. patent application entitled "Classification And Sequencing Of Mixed Data Flows," Ser. No. 11/372,540, filed on Mar. 10, 2006, which is incorporated by reference herein.

FIELD OF THE INVENTION

The present invention relates generally to data processing, and more particularly to generating code for an extract, transform, and load (ETL) data flow.

BACKGROUND OF THE INVENTION

Data integration applications are commonly used to integrate data, e.g., due to mergers and acquisitions among businesses. Data integration can occur in other circumstances, such as when merging data from two different departments (or divisions) in a company, or integrating new data application software with a legacy application. Typical data integration applications are those types of applications in which data from multiple sources on varied data systems and repositories needs to be processed, combined, or otherwise transformed into data that is then loaded into multiple targets, again residing on different data systems and repositories. For example, in some cases, legacy data in text files or spreadsheets is best processed by a specialized extract, transform, and load (ETL) engine. Legacy data is any file, database, or software asset (such as a web service or business application) that has been previously deployed. Two kinds of ETL engines include a relational database engine (e.g., an Oracle or Microsoft Server engine) that can execute structured query language (SQL) statements, and proprietary engine (e.g., from Ascential) that can execute propriety language statements.

In an ETL environment in which a database server acts as an ETL engine, data integration typically begins with a user describing a data flow of an ETL process using a UI (user interface) tool. A data flow represents a logical transformation and flow of data. A code generation system generates code from the data flow, which generated code is then sent to the database server for execution. There are generally two basic requirements involved in code translation and generation—1) generation of correct code that reflects the semantics of an operator graph corresponding to the data flow, and 2) generation of optimized code that has the best performance (e.g., in terms of time and space efficiency) for the underlying ETL engine. Conventional SQL code generation systems, however, typically rely on the underlying ETL engine (or database server) to perform optimization and, therefore, such conventional code generation systems typically only directly translate an operator graph into SQL code. The quality of SQL code generated through such a direct translation approach can vary greatly and, therefore, users are required to be experts in order to verify and take advantage of the generated code. Further, while conventional ETL engines can be optimized for ETL processing, conventional ETL engines can typically only handle single-statement code, and fall short on generating an optimized plan for a much larger amount of multiple-statement code that is typically generated by a code generation system.

BRIEF SUMMARY OF THE INVENTION

In general, in one aspect, this specification describes a computer-implemented method for generating code for an extract, transform, and load (ETL) data flow in an ETL system. The method includes receiving an ETL data flow representing a logical transformation and flow of data, placing a staging table at a pre-determined location in the ETL data flow to reduce a total number of staging tables required by the transformation, and generating code for the transformation based on the ETL data flow including the staging table placed at the pre-determined location.

Implementations can include one or more of the following features. Placing a staging table at a pre-determined location in the in the ETL data flow can include placing staging tables in the ETL data flow at one or more of the following locations: a user-specified location, an output of a data flow operator that requires two or more outputs, a data flow location that crosses databases, a location that serves as a connection of a row-based/set-based subflow, or a location corresponding to a persistent point for the ETL data flow that is used for error recovery purposes. The staging table placed in the ETL data flow can be initially assigned as a declared global temporary table. Generating code for the transformation can further include removing the staging table from the ETL data flow responsive to the staging table no longer being used in a subsequent transformation within the ETL data flow. Generating code for the transformation can further include building an index on a column of a staging table that appears in a JOIN condition following the staging table. Placing a staging table at a pre-determined location in the ETL data flow can include partitioning the staging table.

Implementations can further include one or more of the following features. The method can further include reducing a size of the ETL data flow using a data dependency graph. Generating code for the transformation can further include generating the code for the transformation using the reduced ETL data flow. Reducing a size of the ETL data flow can include removing a column from the ETL data flow that satisfies predetermined criteria. The predetermined criteria can include removing a column from the ETL data flow that does not have a path leading to a column in a data flow relevant column set, in which the data flow relevant column set includes columns in a target table of the ETL data flow and columns referred in a predicate of an operator in the ETL data flow. Removing a column from the ETL data flow can include determining whether to remove a column only from a source table or a staging table in the ETL data flow. Generating code for the transformation can include generating structured query language (SQL) code for the transformation.

In general, in another aspect, a computer program product, tangibly stored on a computer-readable medium is provided. The computer program product comprises instructions for causing a programmable processor to receive an ETL data flow representing a logical transformation and flow of data, place a staging table at a pre-determined location in the ETL data flow to reduce a total number of staging tables required by the transformation, and generate code for the transformation based on the ETL data flow including the staging table placed at the pre-determined location.

In general, in another aspect, this specification describes an extract, transform, and load (ETL) system including a code generation system to receive an ETL data flow representing a logical transformation and flow of data, a first engine (associated with the code generation system) to place a staging table at a pre-determined location in the ETL data flow to reduce a total number of staging tables required by the transformation, and a second engine (associated with the code generation system) to generate code for the transformation based on the ETL data flow including the staging table placed at the pre-determined location.

Implementations can provide one or more of the following advantages. Techniques for increasing the performance of data integration are provided below. In one aspect, a data processing system is provided that eliminates unnecessary columns within data to reduce the volume of data to be transformed. In another aspect, the data processing system reduces the number of staging tables required during a data transformation by requiring placement of staging tables at only pre-determined locations in an ETL data flow.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to generating code for an extract, transform, and load (ETL) data flow. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
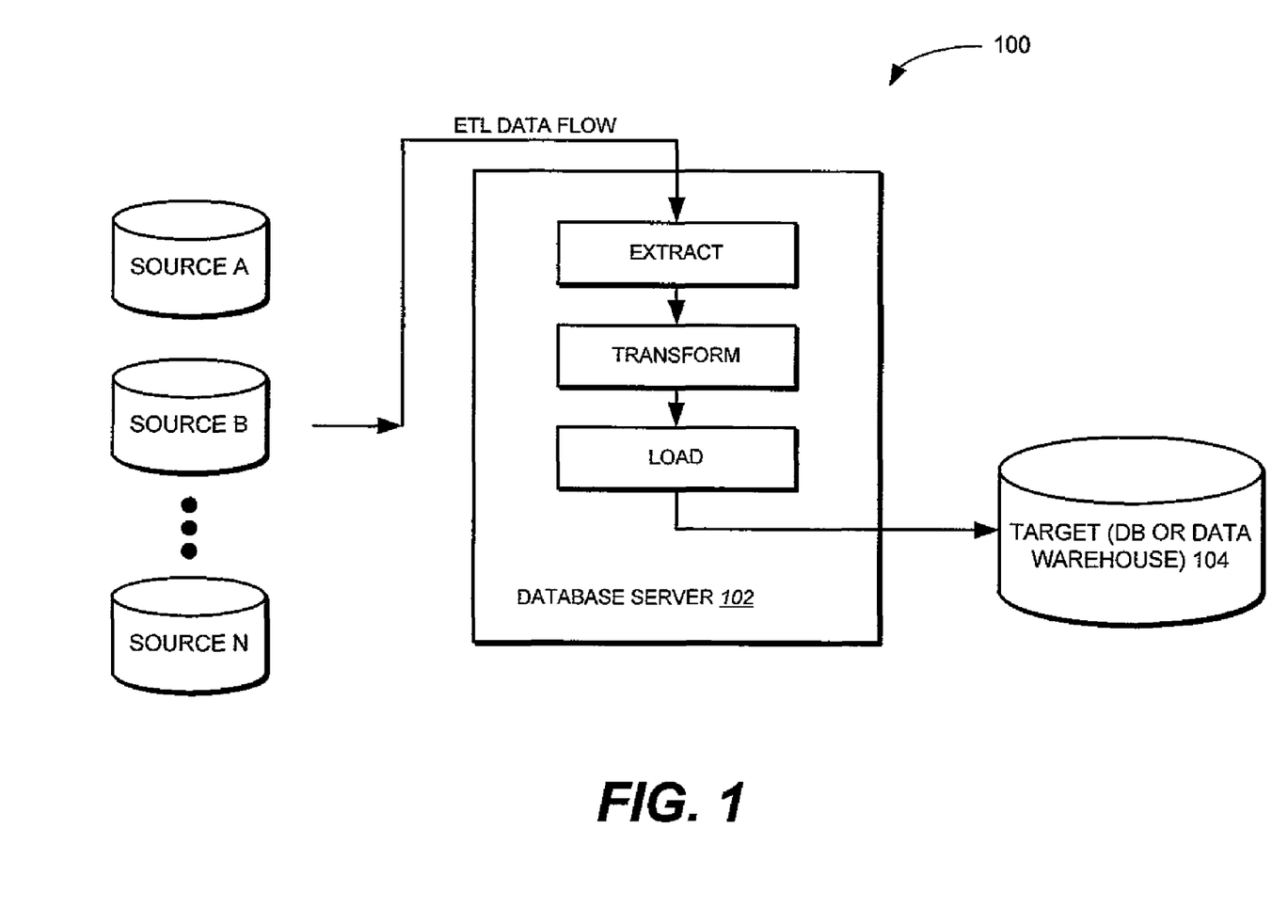
FIG. 1 illustrates an extract, transform, and load (ETL) system in accordance with one implementation of the invention.

FIG. 1 illustrates an extract, transform, and load (ETL) system 100 according to one implementation. The ETL system 100 includes a database server 102 that acts as an ETL engine to integrate data (e.g., from data sources A, B, . . . N) through an extract phase, a transform phase, and a load phase. The extract phase includes extracting data from source systems (e.g., from data sources A, B, . . . N). Most data warehousing projects consolidate data from different source systems. Each separate source system may also use a different data organization/format. Common data source formats include, for example, relational databases and flat files, and include non-relational database structures such as IMS. Extraction converts the data into a format for transformation processing. The transform phase applies a series of rules or functions to the extracted data to derive the data to be loaded. The load phase loads the data into a data warehouse (e.g., data warehouse 104. Data integration typically begins with a user describing a data flow of an ETL process using a UI (user interface) tool. A data flow represents a logical transformation and flow of data. A code generation system generates code from the data flow, which generated code is then sent to the database server for execution.

Figure 2:
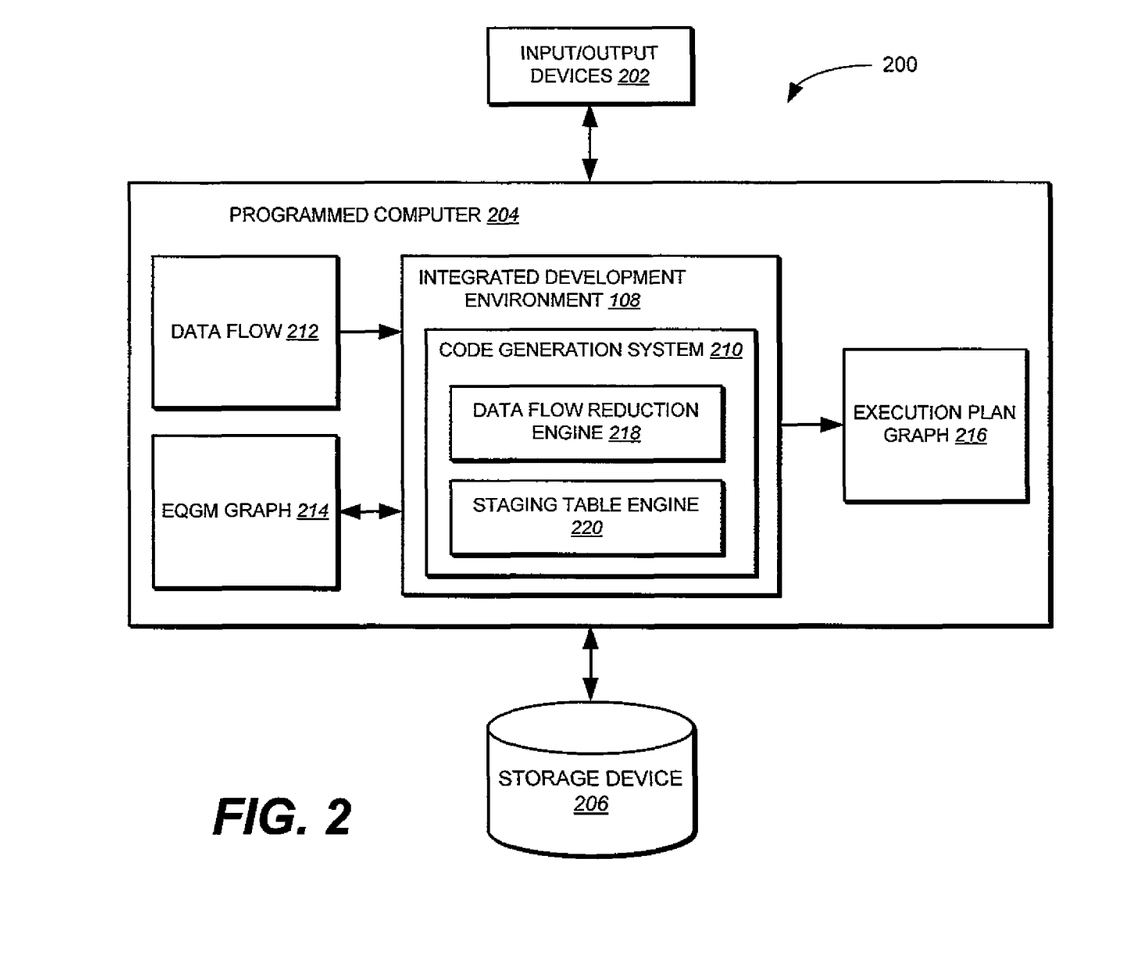
FIG. 2 is a block diagram of a data processing system including a code generation system in accordance with one implementation of the invention.

FIG. 2 illustrates a data processing system 200 in accordance with one implementation of the invention. The data processing system 200 can comprise the IBM DB2 Data Warehouse Edition (DWE) product available from International Business Machines Corporation of Armonk, N.Y. Data processing system 200 includes input and output devices 202, a programmed computer 204, and a storage device 206. Input and output devices 202 can include devices such as a printer, a keyboard, a mouse, a digitizing pen, a display, a printer, and the like. Programmed computer 204 can be any type of computer system, including for example, a workstation, a desktop computer, a laptop computer, a personal digital assistant (PDA), a cell phone, a network, and so on.

Running on the programmed computer 204 is an integrated development environment 208. The integrated development environment 208 is a software component that assists users (e.g., computer programmers) in developing, creating, editing, and managing code for target platforms. In one implementation, the integrated development environment 208 includes code generation system 210. In operation, a data flow 212 (e.g., an ETL data flow) is received by the code generation system 210, and the data flow is converted by the code generation system into an extended query graph model (EQGM graph) 214. The EQGM graph 214 is an internal data model used by the code generation system 210 for analysis and optimization as discussed below. After analysis, the EQGM 214 is converted into an extended plan graph 216. The extended plan graph 216 represents the code generated by the code generation system 210 and is sent to a runtime engine (e.g., an ETL engine) for execution.

The code generation system 210 includes (in one implementation) a data flow reduction engine 218 and a staging table engine 220 for optimizing code generated by the code generation system 208 (e.g., the extended plan graph 216). In one implementation, the data flow reduction engine 218 reduces the size of a data flow—e.g., data flow 212—by eliminating unnecessary columns within the data flow, as described in greater detail below. The elimination of unnecessary columns reduces the volume of data to be transformed. In one implementation, the staging table engine 208 reduces the number of staging tables required during a data transformation by requiring placement of staging tables at only pre-determined locations in a data flow as described in greater detail below.

In addition, in one implementation, the staging table engine 208 further assigns each internal staging table as type (DB2) declared global temporary table (DGTT) in order to attain the benefits of global declared temporary tables. Such benefits can include, for example, performance in terms of not having lock, log, etc., overhead as would an ordinary persistent table. In one implementation, when a declared temporary table is created, the data processing system 200 does not insert an entry into the system catalog tables; therefore, an associated server does not suffer from catalog contention issues. In comparison to regular tables, the data processing system 200 does not lock declared temporary tables or their rows, and, if a user specifies the NOT LOGGED parameter when upon creation of a declared temporary table, the data processing system 200 does not log declared temporary tables or their contents. Accordingly, declared temporary tables can be used instead of regular tables for those an application that creates tables to process large amounts of data and drops those tables once the application has finished manipulating that data.

Furthermore, applications that are written for concurrent users can take advantage of declared temporary tables. Unlike regular tables, declared temporary tables are not subject to name collision. For each instance of the application, the data processing system 200 can create a declared temporary table with an identical name. For example, to write an application for concurrent users that uses regular tables to process large amounts of temporary data, a user must typically ensure that each instance of the application uses a unique name for the regular table that holds the temporary data. Typically, a user would create another table that tracks the names of the tables that are in use at any given time. With declared temporary tables, a user can simply specify one declared temporary table name for temporary data. The data processing system 200 guarantees that each instance of the application uses a unique table.

Reducing Size of Data Flow

Figure 3:
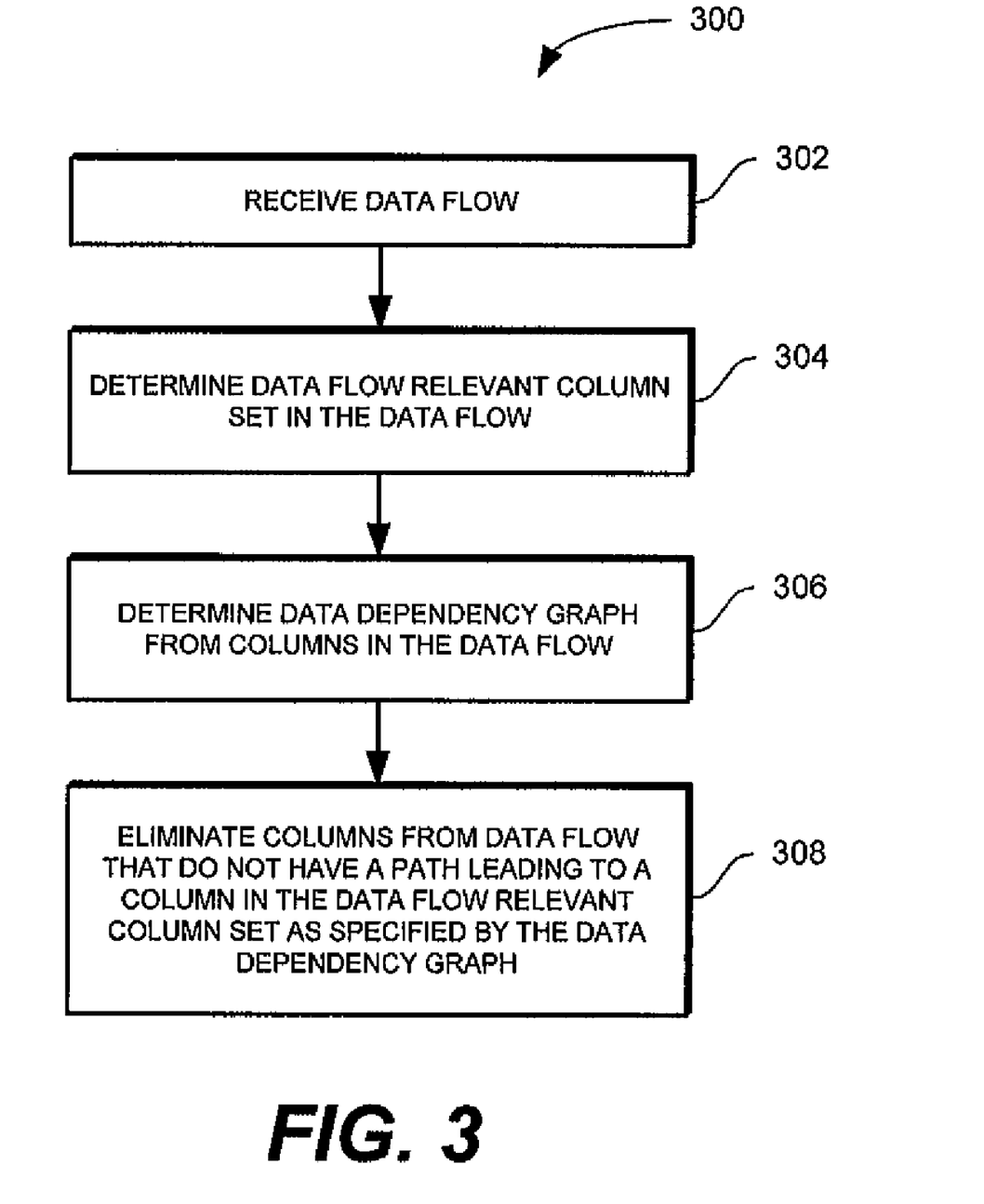
FIG. 3 is a flow diagram of a method for reducing the size of a data flow in accordance with one implementation of the invention.
Figure 4:
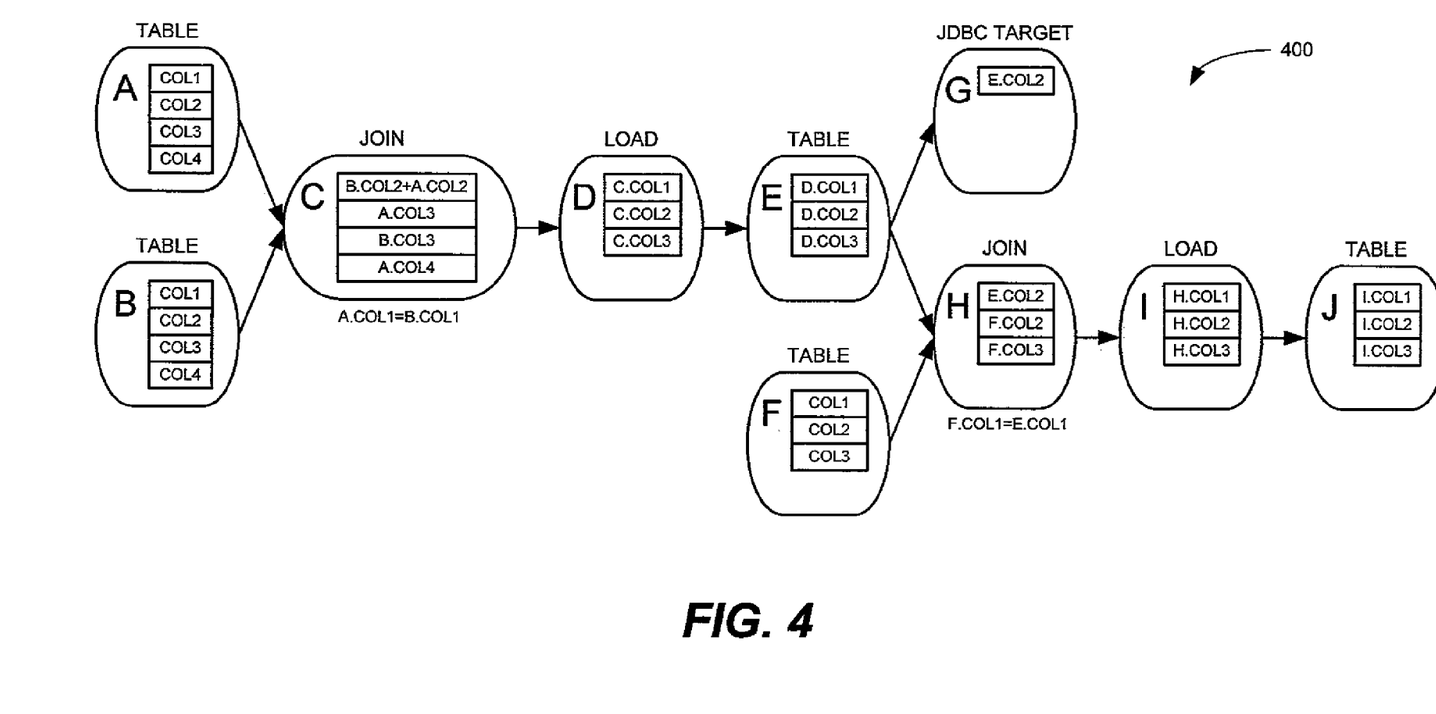
FIG. 4 is a diagram of an example data flow.

FIG. 3 is a flow diagram illustrating a computer-implemented method 300 for reducing the size of a data flow (e.g., data flow 212) in accordance with one implementation of the invention. The method 300 begins with a code generation system (e.g., code generation system 210) receiving a data flow (step 302). A data flow represents a logical transformation and flow of data, and is typically built based on user input. For example, versions of the IBM DB2 Data Warehouse Edition (DWE) product have a data flow graphical editor that enables users to build data flows. The code generation system typically converts a received data flow into an EQGM graph for analysis and optimization. FIG. 4 shows an example transformation graph (or EQGM graph) 400 (based on a received data flow) including tables A, B, E, F, J, JOIN operations C, H, LOAD operations D, I, and a JDBC TARGET G.

Once a data flow is received, a determination of the data flow relevant column set in the data flow is determined (e.g., by the data flow reduction engine 218) (step 304). In one implementation, the data flow relevant column set is a minimal set of columns that includes columns in a target table, and columns having values that determine a result of a transformation. By definition, such a set includes columns in the target table of a transformation, and columns referred to in predicates of an operator. Referring again to the example of FIG. 4, the data flow relevant column set in the data flow is shown in Table 1 below.

TABLE 1

| | |
|---|---|
| Columns in the target table of a transformation | {G.COL1, J.COL1, J.COL2, J.COL3} |
| Columns referred to predicates of an operator | {A.COL1, B.COL1, F.COL1, E.COL1} |

Figure 5:
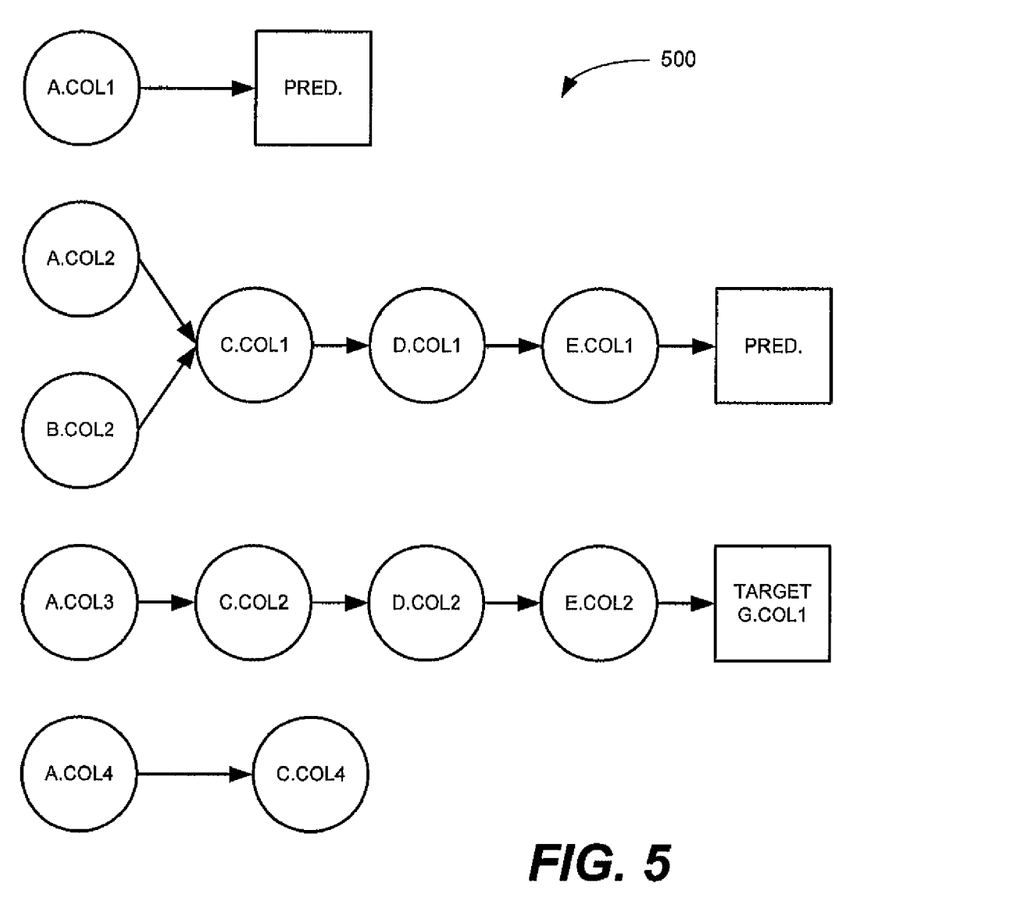
FIG. 5 is a diagram of a data dependency graph of the columns in the data flow of FIG. 4.

A data dependency graph from columns in the data flow is determined (e.g., by the data flow reduction engine 218) (step 306). A data dependency graph is a graph that describes the dependency of column data in a data flow. In one implementation, the nodes of the graph are the columns in the data flow, and the edges of the graph are defined as follows—if a column A is calculated/populated from a column B (i.e., the value of A depends (directly or indirectly) on the value of B), then there is an edge from node B to node A. In one implementation, a data dependency graph is determined for only columns associated with a source table or columns associated with a staging table. A source table is table from which column data is read. Referring to FIG. 5, a data dependency graph 500 is shown for the columns in the source/staging tables of the transformation graph 400 (FIG. 4).

Figure 6:
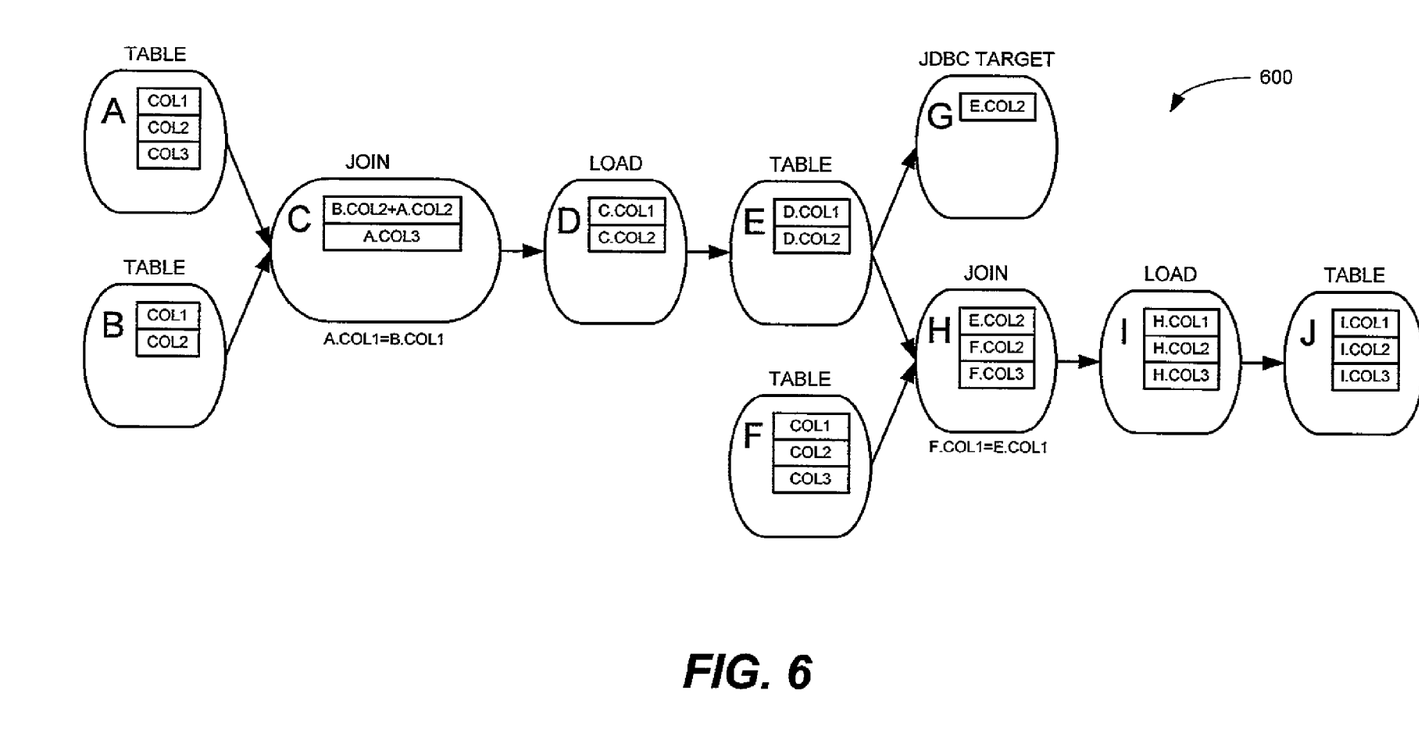
FIG. 6 is a diagram of a data flow that is equivalent to the data flow of FIG. 4.

Columns from the data flow that do not have a path leading to a column in the data flow relevant set as specified by the data dependency graph are eliminated (e.g., by the data flow reduction engine 218) (step 308). As shown in the data dependency graph 500, the columns {A.COL1, A.COL.2, B.COL2, A.COL3} each have a path that leads to a column in the data flow relevant set—e.g., a predicate or column in a target table. However, the column {A.COL4} does not have a path that leads to a column in the data flow relevant set and, therefore, the column {A.COL4} can be eliminated from the data flow as being an unnecessary column. Applying the method 300 to all the source columns in the data flow represented by the EQGM graph 400 reveals that columns {A.COL4, B.COL3, B.COL4, E.COL3} do not have a path that leads to a column in the data flow relevant set and are unnecessary for the transformation represented by the EQGM graph 400. FIG. 6 shows a transformation graph 600 of a data flow that is equivalent to the data flow represented by the transformation graph 400 of FIG. 4. The data flow represented by the transformation graph 600 provides the same result as the data flow represented by the transformation graph 400, but is more time and space efficient.

Optimal Placement of Staging Tables

In an ideal data transformation, data should flow freely and be stored in a staging table only when absolutely necessary. Generally, storing data in a staging table stalls a data pipeline and slows down the performance of a transformation. Therefore, in an optimal data flow, the number of staging tables (and the expense of staging) should be kept minimal. Accordingly, in one implementation, to keep the number of staging tables required in a transformation minimal, the staging table engine 220 (FIG. 2) places staging tables within a data flow only at the following locations—1) user-specified location, 2) output of a data flow operator that requires two or more outputs, 3) data flow location that crosses databases (e.g., at a JDBC connection), 4) location that serves as a connection of a row-based/set-based subflow or SQL-based/non-SQL-based subflow, 5) location corresponding to a persistent point (for the data flow) that is used for, e.g., error recovery purposes.

Declared Global Temporary Tables

Figure 7:
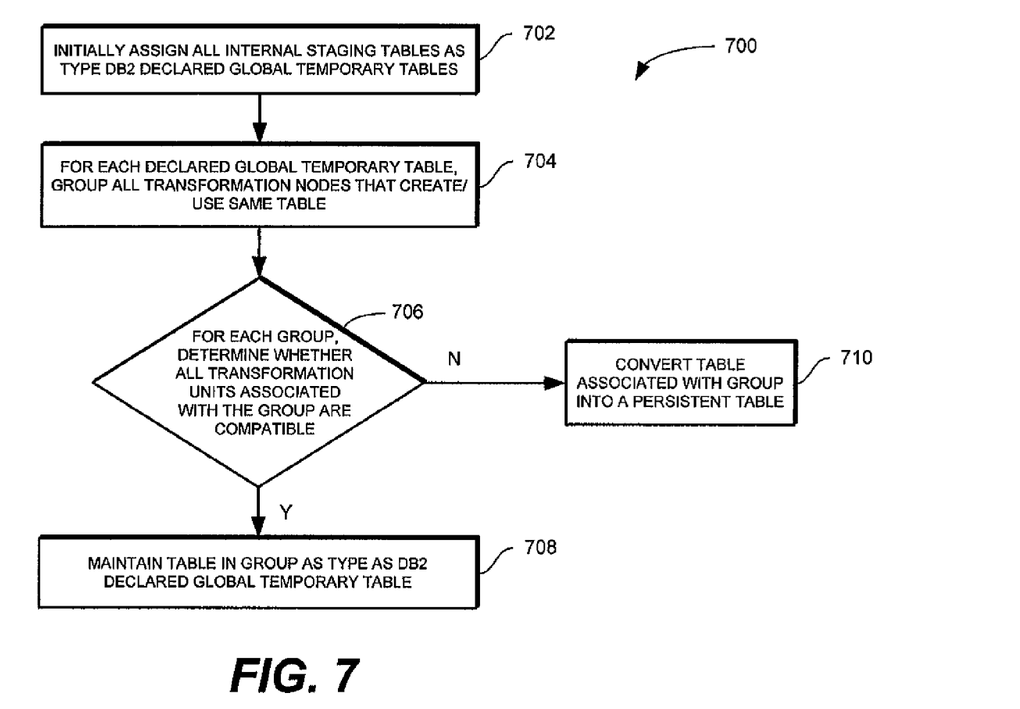
FIG. 7 is a flow diagram of a method for assigning a type to staging tables in a data flow in accordance with one implementation of the invention.

Further to achieve better performance, in one implementation, the staging table engine 220 implements DB2 declared global temporary tables (DGTTs) whenever possible. A created temporary table exists only as long as the process that uses the temporary table. Accordingly, because DB2 DGTTs cannot live through different processes (or sessions), in some situations the staging table engine 220 implements persistent tables instead of a DGTT. FIG. 7 illustrates a flow diagram of a method 700 for assigning a type to staging tables in a data flow in accordance with one implementation of the invention. The method 700 begins with all internal staging tables being initially assigned (e.g., by the staging table engine 220) as type DB2 declared global temporary tables (step 702). For each staging table assigned as a type DB2 declared global temporary table, all transformation nodes that create or use the staging table in the data flow are grouped together (e.g., by the staging table engine 220) (step 704). For each group of transformation nodes, a determination is made (e.g., by the staging table engine 220) whether the transformation nodes that create or use the same staging table are compatible (or can be promoted to be compatible) (step 706). In one implementation, transformation nodes that are compatible can be run together within one (DB2) session. For example, if a transformation node generates a Java code unit, that will run through a JDBC connection, such a transformation node is not compatible with a transformation node that generates a SQL script that runs through a command line. If all the transformation nodes associated with a given staging table are compatible, then the type of the staging table is maintained (e.g., by the staging table engine 220) as type DB2 declared global temporary table (step 708). If all the transformation nodes associated with a given staging table are not compatible, then the type of the staging table is converted (e.g., by the staging table engine 220) into a persistent table (step 710).

Figure 8:
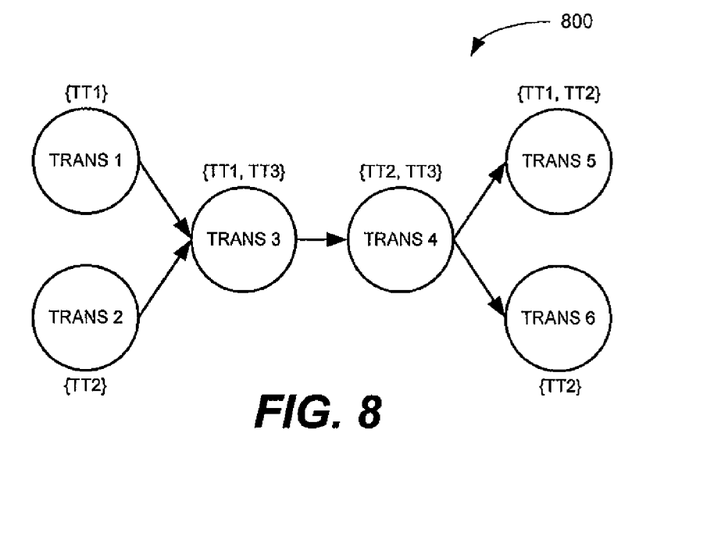
FIG. 8 is a diagram showing temporary table usage of transformation nodes associated with a data flow.

FIG. 8 illustrates is a graph 800 showing temporary (staging) table usage of transformation nodes TRANS 1-TRANS 6 associated with an example data flow. As shown in FIG. 8, a temporary table TT1 is created (or used by) transformation node TRANS 1, a temporary table TT2 is created (or used by) transformation node TRANS 2, the temporary table TT1 and a temporary table TT3 is created (or used by) transformation node TRANS 3, the temporary table TT2 and the temporary table TT3 is created (or used by) transformation node TRANS 4, the temporary table TT1 and the temporary table TT2 is created (or used by) transformation node TRANS 5, and the temporary table TT2 is created (or used by) transformation node TRANS 6. In accordance with method 700, temporary table TT1 is created/used in transformation nodes TRANS 1, TRANS 3, and TRANS 5. If each of transformation nodes TRANS 1, TRANS 3, and TRANS 5 are compatible (or can be promoted to be compatible), then the temporary table TT1 can remain as type DB2 declared global temporary table, otherwise the temporary table TT1 is converted into a persistent table.

Garbage Collection of Unused Staging Tables

In one implementation, if a temporary table is no longer used in a subsequent transformation, then the temporary table is dropped (or removed) (e.g., by the staging table engine 220) to save space. With respect to a data flow transformation graph, a table is live on an edge if there is a direct path from that edge to a use of that table that does not go through any definition of that table. A table is live-in on a transform node if that table is live in any of the in-edges of that transform node, and a table is live-out of a transform node if that table is live on any of the out-edges of that transform node. Any table that does not live-out of a transform node is dropped right after that transform node. The live-in and live-out for a transform node is calculated (in one implementation) as follows:

$$livein[n]=use[n] Y(liveout[n]-def[n]) \quad (eq. 1)$$

$$liveout[n]=Y livein[s], s \in successor[n] \quad (eq. 2)$$

where def[n] is the data object (or table) defined in the node n, use[n] is the data object used in the node n.

In a data flow that has only one dimension, equations 1 and 2 above can be simplified as follows.

For all nodes except the last one, $$livein[n]=use[n] Y(liveout[n]-def[n]) \quad (eq. 3)$$

$$liveout[n]=Y livein[n+1] \quad (eq. 4)$$

And for the last node, $$livein[n]=use[n] \quad (eq. 5)$$

$$liveout[n]=\phi \quad (eq. 6)$$

Thus, referring to the to the example graph 800 shown in FIG. 8, the live-in set for the transformation node TRANS 3 includes temporary tables TT1, TT2, and the live-out set for the transformation node TRANS 3 includes temporary tables TT1, TT2, TT3. For the transformation node TRANS 4, the live-in set includes temporary tables TT1, TT2, TT3, and the live-out set includes temporary tables TT1, TT2. Based on the above, since the temporary table TT3 does not live out of transformation node TRANS 4, the temporary table TT3 is dropped after the transformation node TRANS 4 is complete and prior to the beginning of transformation node TRANS 5 and transformation node TRANS 6.

In one implementation, the staging table engine 220 (FIG. 2) further optimizes a data flow by building an index on the columns of internal staging tables that appear in a following JOIN condition. By building the index, the speed of the JOIN performance can be enhanced. For example, in the example data flow represented in FIG. 4, the staging table engine 220 can build an index on column 1 of table E since that column is referred to in the following JOIN. Further, in one implementation, the code generation system 210 (FIG. 2) includes a database partitioning feature (DPF). DPF permits partitioning of a database across multiple servers or within a large SMP server, which is particularly useful in data warehousing and data mining. Thus, in one implementation, the staging table engine 220 generates partitioned internal staging tables within a transform. The partitioning key can be determined by using a column data dependency graph. In one implementation, the partitioning key is the column that has a path that leads to the closest column in a JOIN operation condition or partitioning key column in a target table. For example, referring to the data flow represented in FIG. 4, an internal staging table E is created. Suppose that destination (or target) table J is partitioned and the partitioning key is J.COL1. At the same time, the column E.COL1 has a path to the following JOIN condition. Since the JOIN condition is closer to the internal staging table E relative to the target table J, then table E is partitioned using the partitioning key E.COL1.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 9:
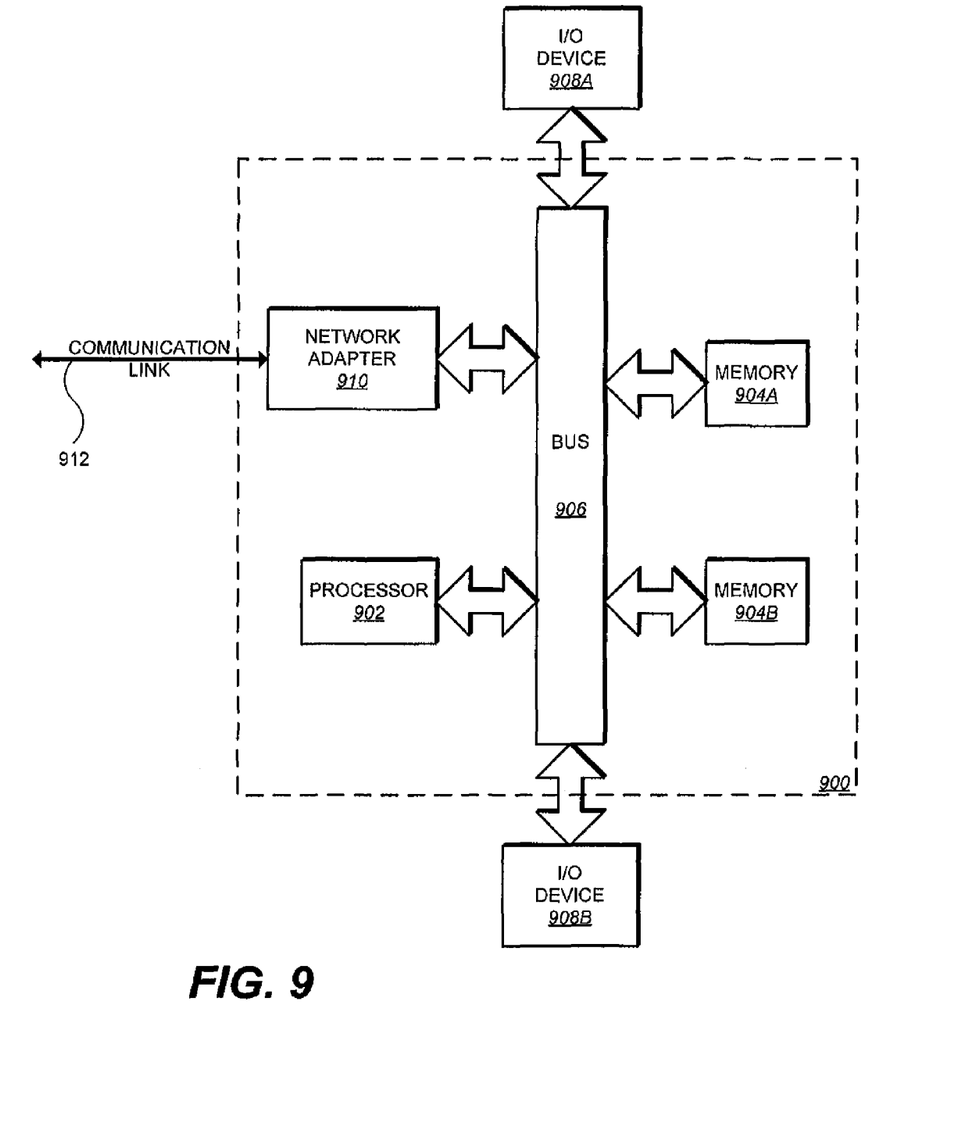
FIG. 9 is a block diagram of a data processing system suitable for storing and/or executing program code in accordance with one implementation of the invention.

FIG. 9 illustrates a data processing system 900 suitable for storing and/or executing program code. Data processing system 900 includes a processor 902 coupled to memory elements 904A-B through a system bus 906. In other implementations, data processing system 900 may include more than one processor and each processor may be coupled directly or indirectly to one or more memory elements through a system bus.

Memory elements 904A-B can include local memory employed during actual execution of the program code, bulk storage, and cache memories that provide temporary storage of at least some program code in order to reduce the number of times the code must be retrieved from bulk storage during execution. As shown, input/output or I/O devices 908A-B (including, but not limited to, keyboards, displays, pointing devices, etc.) are coupled to data processing system 900. I/O devices 908A-B may be coupled to data processing system 900 directly or indirectly through intervening I/O controllers (not shown).

In one implementation, a network adapter 910 is coupled to data processing system 900 to enable data processing system 900 to become coupled to other data processing systems or remote printers or storage devices through communication link 912. Communication link 912 can be a private or public network. Modems, cable modems, and Ethernet cards are just a few of the currently available types of network adapters.

Various implementations for generating code based on an ETL data flow have been described. Nevertheless, various modifications may be made to the implementations described above, and those modifications would be within the scope of the present invention. For example, although the above techniques are described in the context of data processing applications (e.g., data warehousing applications), the techniques can be applied generally to a variety of other applications. Also, the general idea of reducing unnecessary data is applicable to most data processing systems, however, other techniques can be used to specifically identify the unnecessary data may be used other than those techniques discussed above. Accordingly, many modifications may be made without departing from the scope of the present invention.

What is claimed is:

1. A computer-implemented method for generating code for an extract, transform, and load (ETL) data flow in an ETL system, the method comprising:
   receiving an ETL data flow representing a logical transformation and flow of data;
   reducing a size of the ETL data flow using a data dependency graph;
   placing a staging table at a pre-determined location in the ETL data flow to reduce a total number of staging tables required by the transformation; and
   generating code for the transformation based on the ETL data flow including the staging table placed at the pre-determined location, wherein generating code for the transformation further includes generating the code for the transformation using the reduced ETL data flow.

2. The method of claim 1, wherein placing a staging table at a pre-determined location in the in the ETL data flow includes placing a staging table in the ETL data flow at one or more of the following locations:
   a user-specified location;
   an output of a data flow operator that requires two or more outputs;
   a data flow location that crosses databases;
   a location that serves as a connection of a row-based/set-based subflow; or
   a location corresponding to a persistent point for the ETL data flow that is used for error recovery purposes.

3. The method of claim 1, wherein the staging table placed in the ETL data flow is initially assigned as a declared global temporary table.

4. The method of claim 3, wherein generating code for the transformation further includes removing the staging table from the ETL data flow responsive to the staging table no longer being used in a subsequent transformation within the ETL data flow.

5. The method of claim 1, wherein generating code for the transformation further includes building an index on a column of a staging table that appears in a JOIN condition following the staging table.

6. The method of claim 1, wherein placing a staging table at a pre-determined location in the ETL data flow includes partitioning the staging table.

7. The method of claim 1, wherein reducing a size of the ETL data flow includes removing a column from the ETL data flow that satisfies a predetermined criteria.

8. The method of claim 7, wherein the predetermined criteria includes removing a column from the ETL data flow that does not have a path leading to a column in a data flow relevant column set, the data flow relevant column set including columns in a target table of the ETL data flow and columns referred in a predicate of an operator in the ETL data flow.

9. The method of claim 8, wherein removing a column from the ETL data flow includes determining whether to remove a column only from a source table or a staging table in the ETL data flow.

10. The method of claim 1, wherein generating code for the transformation includes generating structured query language (SQL) code for the transformation.

11. A computer program product, tangibly stored on a computer-readable medium, for generating code for an extract, transform, and load (ETL) data flow in an ETL system, the computer program product comprising instructions for causing a programmable processor to:
   receive an ETL data flow representing a logical transformation and flow of data;
   reduce a size of the ETL data flow using a data dependency graph;
   place a staging table at a pre-determined location in the ETL data flow to reduce a total number of staging tables required by the transformation; and
   generate code for the transformation based on the ETL data flow including the staging table placed at the pre-determined location, and wherein the instructions to generate code for the transformation further include instructions to generate the code for the transformation using the reduced ETL data flow.

12. The computer program product of claim 11, wherein the instructions to place a staging table at a pre-determined location in the in the ETL data flow include instructions to place a staging table in the ETL data flow at one or more of the following locations:
   a user-specified location;
   an output of a data flow operator that requires two or more outputs;
   a data flow location that crosses databases;
   a location that serves as a connection of a row-based/set-based subflow; or
   a location corresponding to a persistent point for the ETL data flow that is used for error recovery purposes.

13. The computer program product of claim 11, wherein the staging table placed in the ETL data flow is initially assigned as a declared global temporary table.

14. The computer program product of claim 13, wherein the instructions to generate code for the transformation further include instructions to remove the staging table from the ETL data flow responsive to the staging table no longer being used in a subsequent transformation within the ETL data flow.

15. The computer program product of claim 11, wherein the instructions to generate code for the transformation further include instructions to build an index on a column of a staging table that appears in a JOIN condition following the staging table.

16. The computer program product of claim 11, wherein the instructions to place a staging table at a pre-determined location in the ETL data flow include instructions to partition the staging table.

17. An extract, transform, and load (ETL) system comprising a processor:
   a code generation system to receive an ETL data flow representing a logical transformation and flow of data;
   a first engine associated with the code generation system to place a staging table at a pre-determined location in the ETL data flow to reduce a total number of staging tables required by the transformation; and
   a second engine associated with the code generation system to generate code for the transformation based on the ETL data flow including the staging table placed at the pre-determined location.

18. The ETL system of claim 17, wherein the code comprises structured query language (SQL) code.

* * * * *